(12) United States Patent
Kim et al.

(10) Patent No.: US 9,825,275 B2
(45) Date of Patent: Nov. 21, 2017

(54) BI-CELL FOR SECONDARY BATTERY HAVING IMPROVED STABILITY AND METHOD OF PREPARING THE SAME

(71) Applicant: LG CHEM, LTD., Seoul (KR)

(72) Inventors: Jung Han Kim, Daejeon (KR); Min Su Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 505 days.

(21) Appl. No.: 14/467,542

(22) Filed: Aug. 25, 2014

(65) Prior Publication Data

US 2014/0363729 A1    Dec. 11, 2014

Related U.S. Application Data

(63) Continuation of application No. PCT/KR2014/001538, filed on Feb. 26, 2014.

(30) Foreign Application Priority Data

Feb. 26, 2013  (KR) .................. 10-2013-0020254

(51) Int. Cl.
*H01M 2/18*  (2006.01)
*H01M 2/14*  (2006.01)
(Continued)

(52) U.S. Cl.
CPC .......... *H01M 2/266* (2013.01); *H01M 2/145* (2013.01); *H01M 2/1673* (2013.01); *H01M 2/18* (2013.01);
(Continued)

(58) Field of Classification Search
None
See application file for complete search history.

(56) References Cited

U.S. PATENT DOCUMENTS 6,077,624 A    6/2000   Mitchell et al.
6,998,190 B2   2/2006   Nobuta et al.
(Continued)

FOREIGN PATENT DOCUMENTS

CN    102884665 A    1/2013
EP     2337107 A1    6/2011
(Continued)

OTHER PUBLICATIONS

International Search Report, issued in PCT/KR2014/001538, dated May 26, 2014.
(Continued)

*Primary Examiner* — Jonathan Crepeau
(74) *Attorney, Agent, or Firm* — Birch, Stewart, Kolasch & Birch, LLP

(57) ABSTRACT

Provided are a bi-cell for a secondary battery having improved stability which may reduce shrinkage of a separator, and a method of preparing the bi-cell. The bi-cell for a secondary battery having improved stability according to an exemplary embodiment of the present invention is characterized in that a cathode and an anode are alternatingly disposed in a state in which the cathode has one more layer than the anode or the anode has one more layer than the cathode, separators having a bigger size than the cathode and the anode and insulating the cathode and the anode are disposed between the cathode and the anode, and edges of an upper separator and edges of a lower separator, which face to each other having the cathode and the anode disposed therebetween, are attached to each other to form fused portions.

9 Claims, 1 Drawing Sheet

(51) Int. Cl.
*H01M 2/26* (2006.01)
*H01M 10/04* (2006.01)
*H01M 2/16* (2006.01)
*H01M 10/0585* (2010.01)

(52) U.S. Cl.
CPC ........ *H01M 10/04* (2013.01); *H01M 10/0585* (2013.01); *Y10T 29/49108* (2015.01)

(56) References Cited

U.S. PATENT DOCUMENTS

| | | | |
|---|---|---|---|
| 8,034,478 | B2 | 10/2011 | Lee et al. |
| 2007/0154790 | A1 | 7/2007 | Jeung et al. |
| 2010/0261047 | A1 | 10/2010 | Kim et al. |
| 2011/0135996 | A1 | 6/2011 | Ahn et al. |
| 2011/0151307 | A1* | 6/2011 | Hwang ................ H01M 2/021 429/129 |
| 2011/0195298 | A1 | 8/2011 | Daidoji et al. |
| 2012/0225345 | A1 | 9/2012 | Kim |
| 2012/0295158 | A1 | 11/2012 | Tanaka et al. |
| 2012/0321932 | A1 | 12/2012 | Ise et al. |
| 2013/0171497 | A1 | 7/2013 | Enomoto et al. |
| 2013/0236766 | A1* | 9/2013 | Seo ....................... H01M 2/145 429/144 |
| 2013/0236767 | A1 | 9/2013 | Nishikawa et al. |

FOREIGN PATENT DOCUMENTS

| | | |
|---|---|---|
| JP | 6-36781 A | 2/1994 |
| JP | 8-7859 A | 1/1996 |
| JP | 9-213377 A | 8/1997 |
| JP | 2002-208442 A | 7/2002 |
| JP | 2003-017112 A | 1/2003 |
| JP | 2003-92100 A | 3/2003 |
| JP | 2003-272595 A | 9/2003 |
| JP | 2010-62109 A | 3/2010 |
| JP | 2010-232265 A | 10/2010 |
| JP | 2011-165481 A | 8/2011 |
| JP | 2011-204615 A | 10/2011 |
| JP | 2011-238357 A | 11/2011 |
| JP | 2012-64448 A | 3/2012 |
| JP | 2012-114075 A | 6/2012 |
| KR | 10-2007-0073169 A | 7/2007 |
| KR | 10-2007-0108582 A | 11/2007 |
| KR | 10-2008-0015159 A | 2/2008 |
| KR | 10-2008-0095770 A | 10/2008 |
| KR | 10-2012-0046091 A | 5/2012 |
| TW | I221679 B | 10/2004 |
| TW | I310252 B | 5/2009 |
| TW | I318474 B | 12/2009 |
| WO | WO 2010/026774 A1 | 3/2010 |
| WO | WO 2012060604 * | 5/2012 |
| WO | WO 2012/124188 A1 | 9/2012 |

OTHER PUBLICATIONS

Written Opinion of the International Search Authority, issued in PCT/KR2014/001538, dated May 26, 2014.

* cited by examiner

[Fig. 1]
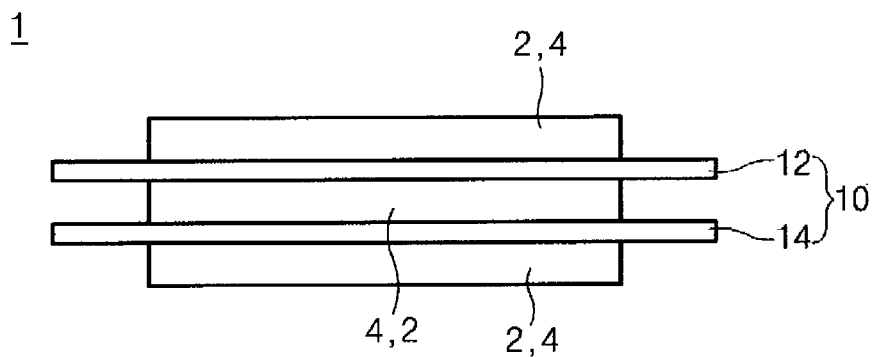
[Fig. 2]
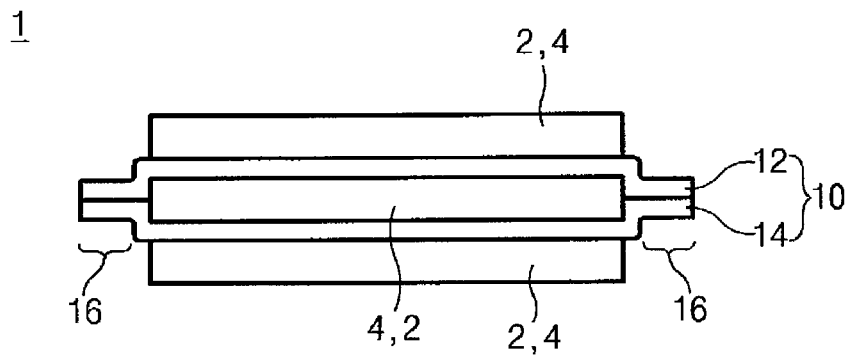
[Fig. 3]
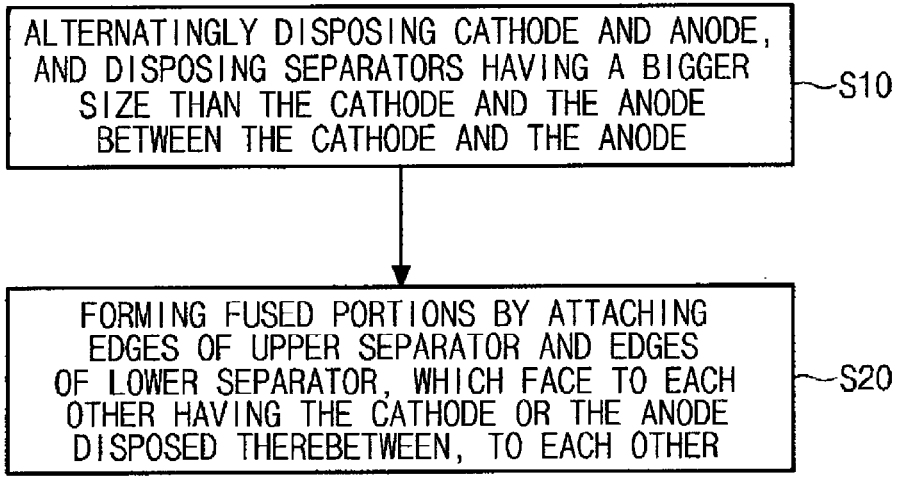

BI-CELL FOR SECONDARY BATTERY HAVING IMPROVED STABILITY AND METHOD OF PREPARING THE SAME

CROSS REFERENCE TO RELATED APPLICATIONS

This application is a Continuation of PCT International Application No. PCT/KR2014/001538, filed on Feb. 26, 2014, which claims priority under 35 U.S.C. 119(a) to Patent Application No. 10-2013-0020254, filed in the Republic of Korea on Feb. 26, 2013, all of which are hereby expressly incorporated by reference into the present application.

TECHNICAL FIELD

The present invention relates to a bi-cell for a secondary battery having improved stability and a method of preparing the same, and more particularly, to a bi-cell for a secondary battery having improved stability which may reduce shrinkage of a separator, and a method of preparing the bi-cell.

BACKGROUND ART

This application claims the priority of Korean Patent Application No. 10-2013-0020254, filed on Feb. 26, 2013, in the Korean Intellectual Property Office, the disclosure of which is incorporated herein by reference.

In general, demand for secondary batteries has been rapidly increased as technology development and demand with respect to mobile devices have increased. Among these secondary batteries, lithium (ion/polymer) secondary batteries having high energy density and operating voltage as well as excellent shelf-life and cycle life characteristics have been widely used as energy sources of various electronic products as well as various mobile devices.

A lithium secondary battery is typically composed of an electrode assembly that is formed by sequentially stacking electrodes and separators, and a case or pouch accommodating the electrode assembly and an electrolyte. Also, the electrode assembly is composed of a unit cell or a bi-cell as a major component.

Referring to Korean Patent Application Laid-Open Publication No. 2008-0095770, a bi-cell, in which a cathode, a separator, an anode, a separator, and a cathode, are sequentially stacked, and a bi-cell, in which an anode, a separator, a cathode, a separator, and an anode are sequentially stacked, are disclosed.

These bi-cells may be formed by alternatingly disposing an electrode (cathode or anode) and a separator, and attaching each layer to each other.

Typically, since binder layers are respectively formed on the surface of the electrode and the surface of the separator, the electrode and the separator are attached to each other when heat and pressure are applied to the electrode and the separator. Thus, the bi-cells may be formed using such a method.

The separator is mainly formed of a polymer material and has shrinkage properties due to heat. Therefore, the separator may be shrunk when heat is supplied from the outside of the secondary battery or heat is generated from the inside of the secondary battery, and as a result, there is a risk that a short circuit may occur due to the contact between the cathode and the anode.

In order to prevent the above phenomenon, a separator having a bigger size than an electrode is used in a bi-cell. However, when the bi-cell is formed using the above separator, edges of the separator may be maintained in the state in which the edges are not attached to the electrode, and typically, a series of processes of preparing a secondary battery may be continuously performed without a special treatment for the edges of the separator.

However, in order to securely prevent the short circuit of the separator, a separator having a considerably larger size than the electrode must be prepared, and as a result, the volume of the secondary battery may eventually increase.

Also, since the separator may be used more than necessary, manufacturing costs of the secondary battery may increase.

DISCLOSURE OF THE INVENTION

Technical Problem

The present invention provides a bi-cell for a secondary battery having improved stability which may use a smaller-sized separator than the prior art, and a method of preparing the bi-cell.

The present invention also provides a bi-cell for a secondary battery having more improved stability than the prior art even in the case in which a separator having the same size or a somewhat smaller size than the prior art is used, and a method of preparing the bi-cell.

The present invention also provides a bi-cell for a secondary battery having improved stability which may reduce preparation costs, and a method of preparing the bi-cell.

Technical Solution

According to an aspect of the present invention, there is provided a bi-cell for a secondary battery having improved stability which is characterized in that: a cathode and an anode are alternatingly disposed in a state in which the cathode has one more layer than the anode or the anode has one more layer than the cathode, separators having a bigger size than the cathode and the anode and insulating the cathode and the anode are disposed between the cathode and the anode, and edges of an upper separator and edges of a lower separator, which face to each other having the cathode or the anode disposed therebetween, are attached to each other to form fused portions.

Binder layers may be respectively formed on surfaces of the upper separator and the lower separator, and the fused portions may be formed by heating and pressing the edges of the upper separator and the edges of the lower separator while being in contact with each other.

The fused portions may be formed by applying a heat of 50° C. to 100° C. and a pressure of 10 gf/cm$^2$ to 20 gf/cm$^2$ to the edges of the upper separator and the edges of the lower separator.

The fused portions may be formed by applying the heat and the pressure for 3 seconds to 5 seconds to the edges of the upper separator and the edges of the lower separator.

The pressure applied to the edges of the upper separator and the edges of the lower separator to form the fused portions may be lower than a pressure required to attach the cathode and the anode to the separators.

According to another aspect of the present invention, there is provided a method of preparing a bi-cell for a secondary battery having improved stability including: alternatingly disposing a cathode and an anode to allow the cathode to have one more layer than the anode or the anode to have one more layer than the cathode, and disposing separators having a bigger size than the cathode and the anode between the cathode and the anode (S10); and forming fused portions by attaching edges of an upper separator and edges of a lower separator, which face to each other having the cathode or the anode disposed therebetween, to each other (S20).

Binder layers may be respectively formed on surfaces of the upper separator and the lower separator, and operation S20 may be performed by heating and pressing the edges of the upper separator and the edges of the lower separator while being in contact with each other.

Operation S20 may be performed by applying a heat of 50° C. to 100° C. and a pressure of 10 gf/cm$^2$ to 20 gf/cm$^2$ to the edges of the upper separator and the edges of the lower separator.

Operation S20 may be performed by applying the heat and the pressure for 3 seconds to 5 seconds to the edges of the upper separator and the edges of the lower separator.

The pressure applied to the edges of the upper separator and the edges of the lower separator to form the fused portions in operation S20 may be lower than a pressure required to attach the cathode and the anode to the separators.

Advantageous Effects

According to the present invention, the following effects may be obtained:

First, a bi-cell having improved stability which may use a smaller-sized separator than the prior art, and a method of preparing the bi-cell may be provided.

Second, a bi-cell for a secondary battery having more improved stability than the prior art even in the case in which a separator having the same size or a somewhat smaller size than the prior art is used, and a method of preparing the bi-cell may be provided.

Third, a bi-cell having improved stability which may reduce the volume of a secondary battery, and a method of preparing the bi-cell may be provided.

Fourth, a bi-cell for a secondary battery having improved stability which may reduce preparation costs, and a method of preparing the bi-cell may be provided.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a cross-sectional view of a bi-cell for a secondary battery illustrating a state in which edges of separators are not fixed;

FIG. 2 is a cross-sectional view of a bi-cell for a secondary battery illustrating a state in which edges of separators are attached to each other to form fused portions; and FIG. 3 is a block diagram illustrating a method of preparing a bi-cell for a secondary battery according to an exemplary embodiment of present invention.

MODE FOR CARRYING OUT THE INVENTION

Hereinafter, a bi-cell for a secondary battery having improved stability according to an exemplary embodiment of the present invention and a method of preparing the same will be described in detail with reference to the accompanying drawings.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention. Accordingly, since the embodiments set forth in the present specification and the configurations illustrated in the drawings are shown by way of example and do not represent all the technological spirit of the present invention, it should be understood that embodiments of the present invention are capable of various modifications, equivalents, and alternatives at the time of present application.

In the drawings, the size of each element or specific parts constituting the element is exaggerated, omitted, or schematically illustrated for convenience in description and clarity. Thus, the size of each element does not entirely reflect an actual size. Moreover, detailed descriptions related to well-known functions or configurations will be ruled out in order not to unnecessarily obscure subject matters of the present invention.

FIG. 1 is a cross-sectional view of a bi-cell for a secondary battery illustrating a state in which edges of separators are not fixed, and FIG. 2 is a cross-sectional view of a bi-cell for a secondary battery illustrating a state in which edges of separators are attached to each other to form fused portions.

Referring to FIGS. 1 and 2, a bi-cell 1 for a secondary battery having improved stability (hereinafter, referred to as "bi-cell") according to an exemplary embodiment of the present invention will be described.

The bi-cell 1 according to the exemplary embodiment of the present invention includes a cathode 2, an anode 4, and separators 10 insulating the cathode 2 and the anode 4.

Also, the cathode 2 and the anode 4 may be alternatingly disposed in a state in which the cathode 2 has one more layer than the anode 4 or the anode 4 has one more layer than the cathode 2. The separators 10 having a bigger size than the cathode 2 and the anode 4 may be disposed between the cathode 2 and the anode 4.

The separators 10 illustrated in FIGS. 1 and 2 are respectively referred to as an upper separator 12 and a lower separator 14 according to the positions thereof.

The bi-cell 1 according to the exemplary embodiment of the present invention may be stacked in the sequence of the cathode 2, the upper separator 12, the anode 4, the lower separator 14, and the cathode 2, or may be stacked in the sequence of the anode 4, the upper separator 12, the cathode 2, the lower separator 14, and the anode 4.

The edges of the upper separator 12 and the edges of the lower separator 14 face to each other having the cathode 2 or the anode 4 disposed therebetween. When the edges of each separator 10 in FIG. 1 are in contact with and attached to each other, fused portions 16 are formed as illustrated in FIG. 2.

FIG. 3 is a block diagram illustrating a method of preparing a bi-cell for a secondary battery according to an exemplary embodiment of present invention.

Referring to FIG. 3, the method of preparing a bi-cell according to the exemplary embodiment of present invention may include the following operations.

First, alternatingly disposing the cathode 2 and the anode 4 to allow the cathode 2 to have one more layer than the anode 4 or the anode 4 to have one more layer than the cathode 2, and disposing the separators 10 having a bigger size than the cathode 2 and the anode 4 between the cathode 2 and the anode 4 are performed (S10).

Next, forming the fused portions 16 by attaching edges of the upper separator 12 and edges of the lower separator 14, which face to each other having the cathode 2 or the anode 4 disposed therebetween, to each other is performed (S20).

When operation S10 and operation S20 are performed, the bi-cell 1 according to the exemplary embodiment of the present invention illustrated in FIG. 2 may be prepared.

Binder layers are respectively formed on surfaces of the upper separator 12 and the lower separator 14.

In operation S20, when the edges of the upper separator 12 and the edges of the lower separator 14 are heated and pressed while being in contact with each other, the binder layers respectively formed on the surfaces of the upper separator 12 and the lower separator 14 are fused together, and thus, the edges of the upper separator 12 and the edges of the lower separator 14 are formed as the fused portions 16.

The upper separators 12 and the lower separators 14 may be typically formed of a polyolefin-based material among polymers. Since the separators 10 formed of the polyolefin-based material has a melting point of about 120° C. to about 140° C., the edges of the separators 10 may be easily fused together when a temperature close to the melting point is applied to the separators 10. However, in addition to the edges of the separators 10, inner sides of the separators 10 that are in contact with the electrodes 2 and 4 may also be fused due to the temperature close to the melting point.

The separators 10 are disposed between the electrodes 2 and 4 to pass ions. However, since fine pores formed in the separators 10 may be clogged when even the inner sides of the separators 10 that are in contact with the electrodes 2 and 4 are melted, an area through which the ions may pass will be decreased. Thus, this may result in a decrease in effective area of the electrodes 2 and 4 that is substantially used in charge and discharge.

In contrast, since the separators 10 do not melt at all when heat of a temperature (e.g., a heat of about 30° C. to about 40° C.) that is excessively lower than the melting point of the polyolefin-based separators 10 is applied to the edges of the separators 10, the fused portions 16 may not be formed in the separators 10. When numerous variables that may occur during a process of applying heat to the edges of the separators 10 are considered, the heat applied to the edges of the separators 10 may be set to not exceed 100° C., and thus, it may be desirable to prevent abnormally excessive melting of the separators 10. Also, no formation of the fused portions 16 may be prevent by applying heat of 50° C. or more, i.e., the minimum temperature at which the fusion of the separators 10 may occur when the heat is applied while pressing the separators 10.

When the pressure is applied to the edges of the separators 10, a thickness of the edges of the separators 10 is decreased and an area of the edges of the separators 10 is increased.

Typically, a process of finishing an electrode assembly prepared using a bi-cell for a secondary battery may include a process of finishing the edges of the separator using a tape. When a case in which the electrodes 2 and 4 are rectangular is assumed, the edges of the separators 10 all protrude from four corners of the electrodes 2 and 4, and in order to finish all four corners of the electrode assembly using the tape, at least two tapes may be required to wrap around the electrode assembly along directions that are perpendicular to each other.

When the electrode assembly is finished as described above, it may be the most difficult to finish a portion (i.e. vertex portion) of the separator in which two corners are met, and, in order to neatly finish the electrode assembly, it may be advantageous for the area of the edges of the separator to be small. Also, in general, since the area of the edges of the separator may be significantly increased when the edges of the separator are pressed too flat, the application of excessively strong pressure to the edges of the separator may reduce finish quality of the separator.

From such a point of view, when a pressure of 20 gf/cm$^2$ or more is applied to the edges of the separators 10 in the present invention, the area of the edges of the separators 10 may be significantly increased, and thus, the finish of the electrode assembly may be difficult.

In contrast, when a pressure of less than 10 gf/cm$^2$ is applied to the edges of the separators 10, the edges of the upper separator 12 and the lower separator 14 may be difficult to be attached to each other. Therefore, in order to achieve the ease of the attachment of the edges of the upper separator 12 and the lower separator 14 as well as the ease of the finish of the electrode assembly, the pressure applied to the edges of the separators 10 may be in a range of 10 gf/cm$^2$ to 20 gf/cm$^2$.

When time for applying the heat and pressure within the above ranges to the edges of the upper separator 12 and the edges of the lower separator 14 is excessively short, the edges of the upper separator 12 and the lower separator 14 may be difficult to be attached to each other, and the edges of the separators 10 may be formed as the fused portions 16 when the heat and pressure are applied for about 3 seconds or more.

However, in a case where the heat and pressure are applied to the edges of the upper separator 12 and the lower separator 14 for 5 seconds or more to form the fused portions 16, it may not be ruled out that even the inner sides of the separators 10 that are in contact with the electrodes 2 and 4 may be melted in addition to the edges of the separators 10. Also, when the time of 5 seconds or more is spent for forming the fused portions 16, the productivity of the bi-cell 1 may be reduced. Therefore, the time during which the heat and pressure are applied to the edges of the upper separator 12 and the edges of the lower separator 14 in order to form the fused portions 16 may be in a range of 3 seconds to 5 seconds.

A pressure of about 100 kgf/cm$^2$ may be required to attach the cathode 2 and the anode 4 to the separators 10. However, as described above, since the pressure ranging from 10 gf/cm$^2$ to 20 gf/cm$^2$ is enough for the pressure that is applied to the edges of the upper separator 12 and the edges of the lower separator 14 in order to form the fused portions 16, the fused portions 16 may be formed at a much lower pressure than the pressure required to attach the cathode 2 and the anode 4 to the separators 10.

Hereinafter, experiments performed for verifying effects of the bi-cell 1 according to the present invention will be described.

COMPARATIVE EXAMPLE

As illustrated in FIG. 1, Comparative Example corresponded to a case in which the edges of the separators were not superimposed on each other. As a result of heating at 150° C. for 30 minutes, it was confirmed that a shrinkage of 20% to 24% was observed.

Experiment Example 1

Experimental Example 1 corresponded to a case in which the edges of the separators 10 were superimposed on each other, but the edges were not attached to each other. As a result of heating at 150° C. for 30 minutes, it was confirmed that a shrinkage of 16% to 18% was observed.

Experiment Example 2

As illustrated in FIG. 2, Experimental Example 2 corresponded to a case in which the edges of the separators 10 were attached to each other to form the fused portions 16. As a result of heating at 150° C. for 30 minutes, it was confirmed that a shrinkage of 9% to 12% was observed.

The bi-cell 1 according to the present invention corresponded to Experimental Example 2, and the prior art corresponded to Comparative Example.

When comparing Experimental Example 1 and Comparative Example, it may be confirmed that the shrinkage of the separators 10 in a state in which the separators 10 were superimposed in double layers may be reduced in comparison to a state in which the separators 10 were separately stacked between the cathode 2 and the anode 4.

Also, when comparing Experimental Example 2 and Experimental Example 1, it may be confirmed that the shrinkage of the separators 10 in a state in which the separators 10 were superimposed in double layers and attached to each other may be further reduced in comparison to a state in which the separators 10 were simply superimposed in double layers.

Eventually, the bi-cell 1 according to the present invention may have an effect of reducing the shrinkage of the separators 10 to ½ or less in comparison to the prior art because a shrinkage reducing effect due to the superimposition of the separators 10 and a shrinkage reducing effect due to the attachment of the separators 10 to each other were added.

Therefore, according to the present invention, risk of having a short circuit between the electrodes 2 and 4 disposed on both surfaces of the separators 10 may be low and thus, the stability of the bi-cell 1 may be improved in comparison to the prior art. Also, the bi-cell 1 having more improved stability than the prior art may be prepared even in the case in which the separators 10 having the same size or a smaller size than the prior art were used.

Since the area of the separators 10 required for preparing the bi-cell 1 having stability equivalent to the prior art was smaller than that of the prior art, the volume of the secondary battery may be reduced.

In addition, since the separators 10 having a smaller area than the prior art may be used in the bi-cell 1, preparation costs of the bi-cell 1 may be reduced.

While the present invention has been shown and described in connection with the exemplary embodiments, it will be apparent to those skilled in the art that modifications and variations can be made without departing from the spirit and scope of the invention as defined by the appended claims.

The invention claimed is:

1. A bi-cell for a secondary battery comprising:
   a cathode and an anode are alternatingly disposed in a state in which the cathode has one more layer than the anode or the anode has one more layer than the cathode;
   separators having a bigger size than the cathode and the anode and insulating the cathode and the anode are disposed between the cathode and the anode; and
   edges of an upper separator and edges of a lower separator, which face to each other having the cathode or the anode disposed therebetween, are attached to each other to form fused portions contacting said cathode or anode disposed therebetween,
   wherein binder layers are respectively formed on surfaces of the upper separator and the lower separator, and
   the fused portions are formed by heating and pressing the edges of the upper separator and the edges of the lower separator while being in contact with each other.

2. The bi-cell for a secondary battery of claim 1, wherein the fused portions are formed by applying a heat of 50° C. to 100° C. and a pressure of 10 gf/cm$^2$ to 20 gf/cm$^2$ to the edges of the upper separator and the edges of the lower separator.

3. The bi-cell for a secondary battery claim 2, wherein the fused portions are formed by applying the heat and the pressure for 3 seconds to 5 seconds to the edges of the upper separator and the edges of the lower separator.

4. The bi-cell for a secondary battery of claim 1, wherein the pressure applied to the edges of the upper separator and the edges of the lower separator to form the fused portions is lower than a pressure required to attach the cathode and the anode to the separators.

5. A method of preparing a bi-cell for a secondary battery, the method comprising:
   alternatingly disposing a cathode and an anode to allow the cathode to have one more layer than the anode or the anode to have one more layer than the cathode, and disposing separators having a bigger size than the cathode and the anode between the cathode and the anode (S10); and
   forming fused portions by attaching edges of an upper separator and edges of a lower separator, which face to each other having the cathode or the anode disposed therebetween, to each other (S20), the fused portions contacting said cathode or anode disposed therebetween,
   wherein binder layers are respectively formed on surfaces of the upper separator and the lower separator, and
   operation S20 is performed by heating and pressing the edges of the upper separator and the edges of the lower separator while being in contact with each other.

6. The method of claim 5, wherein operation S20 is performed by applying a heat of 50° C. to 100° C. and a pressure of 10 gf/cm$^2$ to 20 gf/cm$^2$ to the edges of the upper separator and the edges of the lower separator.

7. The method of claim 6, wherein operation S20 is performed by applying the heat and the pressure for 3 seconds to 5 seconds to the edges of the upper separator and the edges of the lower separator.

8. The method of claim 5, wherein the pressure applied to the edges of the upper separator and the edges of the lower separator to form the fused portions is lower than a pressure required to attach the cathode and the anode to the separators.

9. The method of claim 6, wherein the pressure applied to the edges of the upper separator and the edges of the lower separator to form the fused portions is lower than a pressure required to attach the cathode and the anode to the separators.

* * * * *